Dec. 30, 1969 — H. L. PAYNTER — 3,486,302

ZERO OR REDUCED GRAVITY STORAGE SYSTEM FOR TWO PHASE FLUID

Original Filed June 22, 1966 — 3 Sheets-Sheet 1

INVENTOR.
HOWARD L. PAYNTER
BY
Van Valkenburgh & Lowe
ATTORNEYS

Dec. 30, 1969   H. L. PAYNTER   3,486,302
ZERO OR REDUCED GRAVITY STORAGE SYSTEM FOR TWO PHASE FLUID
Original Filed June 22, 1966   3 Sheets-Sheet 2

INVENTOR.
HOWARD L. PAYNTER
BY
Van Valkenburgh + Lowe
ATTORNEYS

Dec. 30, 1969   H. L. PAYNTER   3,486,302
ZERO OR REDUCED GRAVITY STORAGE SYSTEM FOR TWO PHASE FLUID
Original Filed June 22, 1966   3 Sheets-Sheet 3
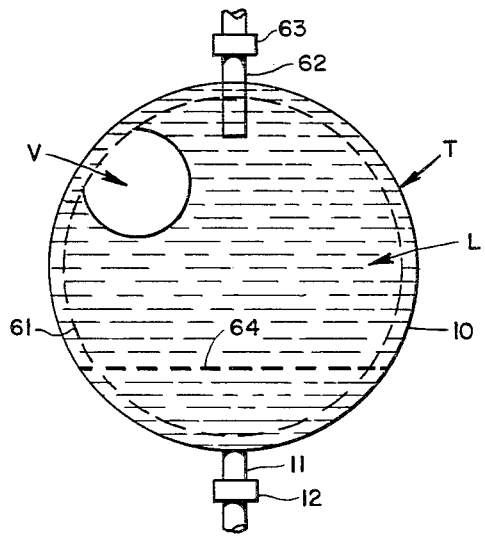
FIG. 8
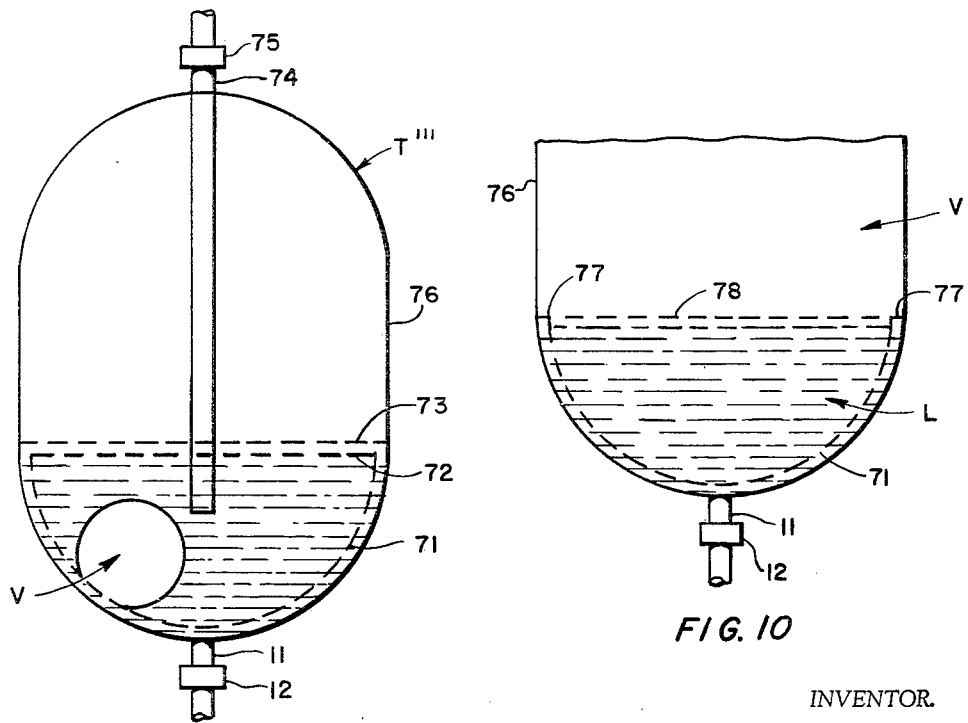
FIG. 9
FIG. 10
INVENTOR.
HOWARD L. PAYNTER
BY
Gary D. Fields
ATTORNEY United States Patent Office 3,486,302
Patented Dec. 30, 1969

3,486,302
ZERO OR REDUCED GRAVITY STORAGE
SYSTEM FOR TWO PHASE FLUID
Howard L. Paynter, Littleton, Colo., assignor to Martin-Marietta Corporation, New York, N.Y., a corporation of Maryland
Continuation of application Ser. No. 565,030, June 22, 1966. This application Feb. 26, 1968, Ser. No. 711,156
Int. Cl. B01d 19/00
U.S. Cl. 55—159                                                                10 Claims

ABSTRACT OF THE DISCLOSURE

The storage system comprises a foraminous means arranged in a tank or vessel to provide a physical barrier to separate the liquid and vapor phases of a two phase fluid system. The foraminous means orients the liquid phase over the liquid drain outlet and utilizes capillary forces of the phases and ullage force to maintain the phases separated when the vessel is subjected to a zero or reduced gravity environment. The foraminous means in one embodiment envelops the liquid phase and is spaced from the walls of the vessel to provide a vaporization region. The foraminous means may also extend into the liquid outflow lines spaced from the walls thereof to extend the vaporization region into the outflow line. The vaporization region is filled by liquid so that vaporization of the liquid is confined to the vaporization region. The vapor so formed is prevented from being ingested into the main body of liquid through the foraminous means by capillary forces and will be purged from the vessel during the pressure relief cycles. By controlling the position of the liquid and maintaining the phases separated, the foraminous means orients the vapor phase so that it is in communication with the vapor outlet of the vessel.

---

This application is a continuation of co-pending application Ser. No. 565,030, filed June 22, 1966 and now abandoned, which is in turn a continuation-in-part of application Ser. No. 440,791, filed Mar. 18, 1965, and now abandoned.

This invention relates to the storage of a two phase fluid, and more particularly to the storage of a two phase fluid under conditions of zero or reduced gravity.

The storage of a two phase fluid, i.e., liquid and vapor, is accomplished relatively simply, when a tank or other vessel in which the fluid is stored is subject to sufficient gravitational force, suuh as on the earth, which will cause the liquid phase to remain in the lower portion of a tank or other storage vessel, with the vapor phase above it. Removal of liquid from the bottom of the storage vessel and the venting of vapor, if the same becomes necessary because of an undue build-up of pressure, from at or near the top of the tank, is readily accomplished. However, when the storage vessel is within an environment in which the force of gravity is greatly reduced or lowered, such as to zero, the problems of withdrawing the liquid phase from the vessel, when desired, as well as the venting vapor, when desired or necessary, are greatly increased. As gravity is reduced, the difference in specific gravity, i.e., weight in relation to volume, of a liquid and vapor, become of less consequence and, at zero gravity, of minimum consequence in determining the flow or position of the liquid and vapor. Such a condition of zero or reduced gravity may occur in the case of a projectile or other vehicle which is in orbit around the earth or another larger body, when the effect of centrifugal force reduces or nullifies the gravity effect of the earth or other body. Such a condition may also occur during interplanetary space travel, when the distance between a heavenly body and the spacecraft is sufficiently great that gravitational effect produced by a heavenly body is insufficient to cause the liquid and vapor to be retained in the desired portion of a storage vessel. Such a condition may also occur when a spacecraft is located between two heavenly bodies, as between the earth and the moon, and the gravitational effect of one counteracts or nullifies the gravitational effect of the other. It will be noted that, during acceleration, such as by rocket blasts, acceleration will be the predominant force and will normally be sufficient to force liquid in a tank or other storage vessel, to or into a discharge outlet, thereby replacing gravity as a dominant positioning force. Of course, the tank should be positioned in the vehicle so that any liquid to be used will be forced into the liquid outlet, upon a rocket blast.

The problems of storage of two phase fluids, during orbit or space travel are further increased in the case of low temperature or cryogenic fluids, when stored for further use, such as liquid oxygen for rocket propulsion or human consumption, or liquid fuels for rocket propulsion. In the case of fluids utilized for rocket propulsion, fluid must often be stored for use at a later time, as for re-entry, orbital guidance or other control purposes, and the like. The principal factor which produces difficulty, particularly during a long storage period, is the absorption of thermal energy, such as radiated heat from the sun, which causes a portion of the low temperature fluid to vaporize. Such vaporization may increase the pressure within the vessel an undue amount, i.e., to or approaching the often relatively low stress resistance of the vessel. In order to save weight, the storage vessel is normally formed of material as light in weight as possible, with a resultant low structural strength. Thus, when the stress limits of the vessel are approached, some of the vapor causing such stress must be exhausted or vented from the vessel to reduce the pressure inside. It is essential that vapor and not liquid is vented so that usable propellant is conserved. When used herein, the term "vapor" refers not only to the vapor produced by evaporation of a liquid, but also to other vapor or gas, such as pressurization gas, i.e., an inert gas used for liquid expulsion.

When a two phase fluid storage system is subjected to zero or reduced gravity, forces which will predominate include fluid intermolecular forces, adhesion, cohesion and surface tension. There are also other forces, such as aerodynamic forces and electric drag, for example, which are ordinarily negligible in character, and thus may normally be neglected, in the same manner that fluid intermolecular force, adhesion, cohesion and surface tension are usually neglected in a gravity-dominated condition.

When the two phase fluid is utilized as a propellant, engine restart capability, as for liquid-fueled rocket engines, is of prime importance, as well as vapor venting to relieve pressure built up within the vessel. Thus, a two phase fluid storage system for use in zero or reduced gravity, containing a rocket propulsion fluid, must insure that a single phase of the fluid, in liquid form, must be available at the tank outlet at any time it is needed, and also insure that a single phase of the fluid, i.e., a vapor phase, must be present at the vapor vent, in order to prevent loss of liquid during venting. When either the liquid phase or the gaseous phase is used for attitude control or as an auxiliary power system of a space or orbiting vehicle, the storage system is subject to the same requirements. When the fluid is to be used for life support only, the problem is similar but the venting of vapor is the primary consideration, although the liquid should be controlled so that vapor only is available at the vent port.

With non-cryogenic fluids, such as storable propellants, there is usually no problem of venting gases, but means must be provided for introducing an inert gas under pressure to the vessel for expulsion of the liquid propellant through the liquid outlet. This must be accomplished without the introduction of gas into the outlet regardless of the orientation of the vessel in a zero or reduced gravity environment.

In any orbiting vehicle or spacecraft, the problem of weight is significant. Thus, any additional weight added to such a storage system must be relatively low, in comparison with the weight of the storage system itself. Bladders or diaphragms have been proposed, to force a liquid to maintain a predetermined position in a tank, when gravitational influence is negligible, but these have been cumbersome, unreliable, cycle-limited and add undue weight to the storage system. Other proposals have involved moving parts, such as centrifugal pumps or other devices which might be utilized to insure the presence of the two phases of a two phase fluid in separate portions of the container, and particularly liquid at the liquid outlet and vapor at the vent port, but these not only normally add undue weight, require power and yield low reliability, but can also produce reactions, resulting in forces which normally require corrective measures to be taken, in order to maintain the attitude of the vehicle.

Among the objects of this invention are to provide a novel storage system for a two phase fluid which is particularly useful when the system is under the influence of a reduced or zero gravity; to provide such a system which does not require moving parts; to provide such a system which has a high reliability; to provide such a system which requires no other energy but fluid energy itself; to provide such a system which adds a minimum of weight but provides high volumetric and expulsion efficiencies; to provide such a system which is effective to provide a single phase (liquid) at the tank outlet and a single phase (vapor) at the vent port, irrespective of changes in the position of the vessel; to provide such a system which is not adversely affected by the production of vapor due to heat absorption; to provide such a system which is effective for either storage of a propellant liquid or a liquid to be converted into vapor, as for life sustaining purposes; to provide such a system which can be varied to suit conditions, as when sustained discharge of liquid is to occur several times; to provide such a system which can be varied to accommodate different fluids, such as fluids which, in the liquid phase, are either wetting or non-wetting with respect to the inside wall of the tank or vessel; and to provide such a system which is applicable to a wide variety of sizes and types of storage vessels.

Additional objects and the novel features of this invention will become apparent from the description which follows, taken in conjunction with the accompanying drawings, in which:

FIG. 8 is a partially diagrammatic, side elevation of a further alternative storage system also embodying the principles of this invention, but wherein the system contains a non-cryogenic liquid;

FIG. 9 is a partially diagrammatic, side elevation of a still further alternative storage system having a large tank which contains a non-cryogenic liquid; and FIG. 10 is a partially diagrammatic, fragmentary, side elevation of a tank like that of FIG. 9, but showing an alternative screen arrangement.

Figure 1:
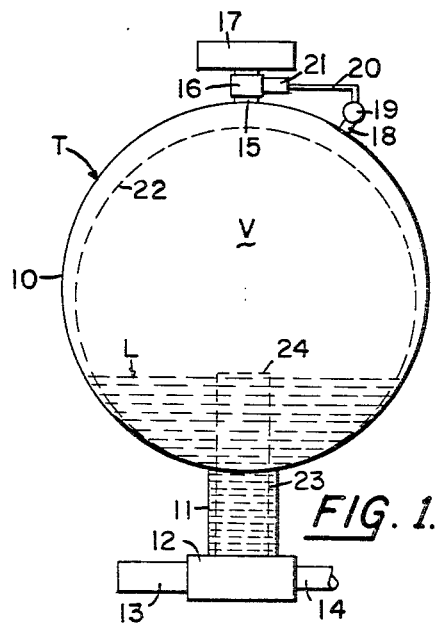
FIG. 1 is a partially diagrammatic, side elevation of a storage system embodying the principles of this invention, including a spherical tank disposed in upright position and adapted to contain a two phase fluid which is wetting in the liquid phase.

In general, a two phase fluid storage system for use in a reduced or zero gravity environment constructed in accordance with this invention, includes a vessel having an outlet for liquid phase fluid, an opposite outlet for vapor phase fluid, and foraminous means spaced a small distance from the inside of the vessel but at different distances, such foraminous means normally but not necessarily extending between the liquid outlet and the vapor outlet. The storage system of this invention relies on fluid energy only. The surface energy or $E_s$ for any three phase system can be expressed in the following Equation 1 as:

$$E_s = (\sigma A)_{lv} + (\sigma A)_{ls} + (\sigma A)_{vs} \quad (1)$$

where $\sigma$ is surface tension; A is interfacial surface area; and the subscripts refer to liquid-vapor or $lv$, liquid-solid or $ls$ and vapor-solid or $vs$ interfaces.

Surface tension is independent of gravity and is essentially independent of system pressure, but is dependent on temperature. If, for the sake of discussion, it is also assummed that the temperature change is negligible, i.e., $\sigma$ is constant, surface energy can only be altered by changing interfacial areas. This is accomplished by proper positioning of the foraminous means inside the storage tank itself.

It can also be shown that the surface force or $F_s$ is:

$$F_s = \sigma L \quad (2)$$

in which L is the characteristic dimension of the system (radius, for example). Since inertial force or $F_i$ is simply:

$$F_i = \rho L^3 g \quad (3)$$

where $\rho$ is mass density of the fluid; and $g$ is the acceleration due to gravity or other forces acting on the system, a dimensionless force ratio or $F_r$, important to proper positioning of the foraminous material, is:

$$Fr = \frac{\rho L^2 g}{\sigma} \quad (4)$$

This force ratio or $F_r$ is commonly referred to as the Bond number or $Bo$. It can be calculated that a fluid system controlled by capillary or surface tension forces will be stable for an absolute $Bo$ less than four, when $Bo$ is determined with $L$ = tank diameter or D. It is also seen from Equation 4 that fluid intermolecular forces will predominate when $Bo < 4.0$, while gravity or inertial forces will dominate when $Bo < 4.0$.

Most liquid propellants, particularly the cryogenics, are totally wetting, i.e., they possesss a liquid-to-solid contact angle or $\theta$ of zero degrees. Their adhesion force is extremely great when compared to cohesion. The opposite is true, of course, for non-wetting liquids. The Dupre relationship is used to determine the theoretical contact angle or $\theta$, i.e.:

$$\theta = \cos^{-1} \frac{(\sigma_{vs} - \sigma_{ls})}{\sigma_{lv}} \text{ or } \cos \theta = \frac{\sigma_{vs} - \sigma_{ls}}{\sigma_{lv}} \quad (5)$$

A liquid is consideded to be a wetting liquid when $\theta$ is less than 90°, while a non-wetting liquid has a contact angle greater than 90°. As mentioned, most liquids when in contact with clean metal are totally wetting. Another form of this relationship, for a totally wetting liquid, i.e., $\theta = 0°$, which is useful in the design of the disclosed systems, results when $\theta = 0$ and $\cos \theta = 1.0$:

$$\sigma_{lv} = \sigma_{vs} - \sigma_{ls} \quad (6)$$

In fact, the use of Equations 1 and 6 is all that is required to design a capillary system for storing a two phase fluid which would be stable to any force disturbance up to $Bo = 4.0$ (Equation 4). A properly designed system will separate the two phases to assure liquid at the tank outlet and vapor at the vent port in a zero ($Bo = 0$) and low-g environment, i.e., $Bo < 4.0$ (see Equation 4). However, typical of this environment is the thermal absorption problem. The system must provide separation of the two fluids during thermal energy addition to the storage tank and its contents. This is accomplished with the foraminous material, as discussed later.

The foraminous means utilized may be a screen such as formed of a woven wire mesh, or a perforated plate, in which the perforations preferably occupy as great an area of the plate as possible. In the foraminous means of this invention, advantage is taken of the fact that, under conditions of earth gravity, a capillary space to cause liquid to creep upwardly against the force of gravity, usually must be rather minute in size. However, under low or zero gravity, the forces of adhesion and cohesion which produce capillary action are dominant, govern fluid behavior and dictate liquid-vapor equilibria. Also, since the foraminous means is inside the tank, only sufficient structural strength to maintain its position is necessary, thereby permitting very thin material, such as a few thousandths of an inch in thickness, to be utilized.

The formaninous means of this invention may be spaced from the inside of the vessel wall a greater distance adjacent the vapor outlet than adjacent the liquid outlet, and at decreasing distances therebetween, for a fluid which, in liquid phase, is adapted to wet the walls of the tank vessel as in FIGS. 1–6. For example, in the case of a tank 5 feet in diameter, the foraminous means may be placed relatively close to the tank wall adjacent the liquid outlet such as on the order of ¼ inch, but at a distance of perhaps 1½ inches adjacent the vapor outlet. Examples of wetting fluids are liquid oxygen, nitrogen tetroxide and most rocket propellant fluids. For a non-wetting fluid, the foraminous means is spaced further from the inside wall of the vessel adjacent the liquid outlet than the vapor outlet and at decreasing distances therebetween as in FIG. 7. Examples of non-wetting fluids are mercury and liquid metals. However, by suitable treatment of the foraminous means, as described later, some normally wetting liquids can be made to act as non-wetting liquids.

It has been found that the foraminous means may be equally spaced from the tank wall at all points, such as ⅛ to ½ inch as in FIG. 8, forming an annulus between the screen and wall. This arrangement is particularly useful for storage and expulsion of non-cryogenic liquids. Also, in a relatively large tank containing a non-cryogenic fluid, a screen envelope only need be provided near the outlet, as in FIGS. 9 and 10 to prevent gas from being discharged through the liquid outlet during restarting of the vehicle in a zero or reduced gravity environment, as discussed below.

In further accordance with this invention, when the liquid is to be discharged from the vessel in two or more stages, one or more additional foraminous means, depending upon the number of stages of discharge, extends across the vessel, transversely to the axis of the liquid outlet and positioned in accordance with the expected level of fluid at the end of each previous stage of discharge. In addition, this transverse means will prevent the liquid from being pulled away from the outlet in a reduced gravity environment, thereby further assuring that liquid remains at the outlet at all times.

In still further accordance with this invention, the liquid outlet, which normally extends axially from the tank to a discharge control valve, may be provided wtih a foraminous standpipe, spaced a small distance from the inside of the outlet and preferably extending into the tank. The standpipe may be tapered; in the case of a wetting liquid, the cross-sectional area would decrease with pipe height. The inner end of this standpipe is also preferably provided with a foraminous cover. However, it has been found that in many situations the standpipe may be omitted.

The vessel is, of course, provided with means at the liquid discharge outlet to control the discharge of liquid therefrom, as well as means at the vapor vent to control the discharge of vapor therefrom, the latter normally, but not necessarily, being responsive to the pressure within the vessel. Of course, if the vessel contains a non-cryogenic liquid, the vapor vent may be used for introducing a gas under pressure into the vessel within the screen of FIGS. 1–9 and above the screen in FIG. 10 so that the liquid will be expelled through the liquid discharge outlet.

Figure 2:
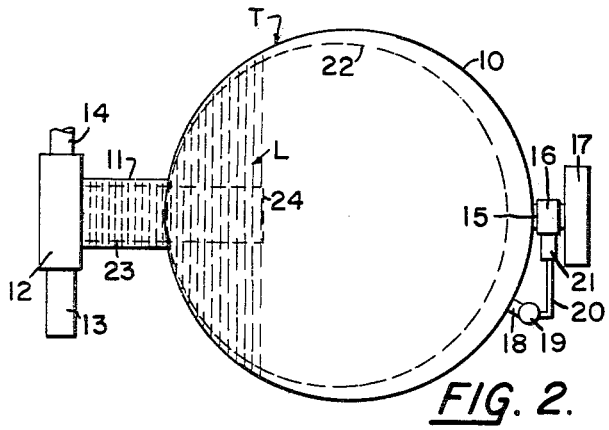
FIG. 2 is similar to FIG. 1, but shows the tank turned on its side and the system under the influence of a zero or reduced gravity.

The foraminous means of this invention may be applied to various sizes, styles and configurations of vessels, such as the spherical tank T of FIGS. 1 and 2, having an inside wall 10, it being understood that tank T may be double walled or covered with insulation (not shown). Tank T is provided with a liquid phase outlet pipe 11, the discharge of liquid L being controlled by a valve 12 adapted to be opened and closed by any suitable device, such as a solenoid 13. When valve 12 is open, liquid will be discharged through a pipe 14. Preferably directly opposite the liquid outlet is a vapor phase outlet 15, for venting vapor or gas V, under control of a valve 16, through a T 17 to which may be connected suitable piping or hoses to conduct the vapor to a desired point of use, or merely expelling the vapor and gas from the system. Adjacent vapor outlet 15, or at any other suitable position, a vapor connection 18 leads to a pressure responsive switch 19, connected by an electrical cable 20 with a solenoid 21, which controls the opening and closing of the gas valve 16. In general, switch 19 is set to actuate solenoid 21 to open valve 16 whenever the vapor pressure in tank T approaches a critical value. This critical pressure is determined as discussed above. The force ratio, $F_r$, acting at each opening of the foraminous material is less than four ($L = D$). Here, the characteristic dimension of the system is the diameter of the screen pores. For the cryogenic application when vapor is contained in the volume formed by the foraminous liner and tank wall, vapor pressure will be kept below the critical pressure by proper venting. For the non-cryogenic case during which liquid is in the space between the foraminous liner and tank wall, this critical pressure determines the pore size of the foraminous material to prevent ingestion of vapor during liquid outflow.

In accordance with this invention, an eccentric, spherical foraminous member 22, hereinafter referred to as a screen, is positioned in closely spaced relation to the inside of the tank wall 10 adjacent liquid outlet 11 but at increasing distances toward vapor outlet 15. Foraminous member 22 may be a woven mesh screen, formed of metal wire or other suitable material or of perforated plate, such as metal, and having a series of closely spaced holes therein of a diameter corresponding to the characteristics of the fluid contained in the tank, such as on the order of several thousandths of an inch down to as small as several microns in diameter. These holes need not be circular, but may have any other suitable shape, such as rectangular, ovoid or other shapes. For example, screens used in the filter industry have been found to be in attractive choice. These screens, manufactured in Europe, have an odd-shaped pore resulting from the Dutch twill weave. An additional foraminous member or standpipe screen 23 is preferably spaced from the inside of liquid outlet pipe 11 a distance corresponding to the spacing of screen 22 adjacent the liquid outlet and also extends inwardly into the tank for a distance, such as one fourth to one half the diameter of the tank, depending upon factors discussed below. Since liquid outlet pipe 11 will usually but not necessarily, be cylindrical, screen 23 will conform in shape thereto and thus normally will be cylindrical. The inner end of screen 23 is also preferably provided with a screen top 24, to sustain a supply of liquid for the outlet 11.

In the event that a life sustaining fluid, such as liquid oxygen, is stored in tank T, liquid outlet pipe 11 may be omitted, although a liquid outlet, useful also as a filling inlet, will normally be desirable. Such a liquid inlet will, of course, be provided with valve means for closing the inlet after filling and will also permit discharge of liquid. In such an instance, the standpipe screen 23 may be omitted, if desired. Also, it has been found that the standpipe screen is not necessary for non-cryogenic liquids.

Although also discussed in connection with FIG. 5, screen 22 will, through adhesion of the liquid to the edges of the screen spaces, provide a liquid barrier between the body of liquid L and the tank wall 10, so that any gas produced on the tank wall, if coalescing into a bubble larger than the screen holes, will be unable to penetrate this barrier and will therefore be forced to move along wall 10 and thereby join the vapor V. Standpipe 23 similarly provides a liquid barrier adjacent outlet pipe 12, forcing coalescing gas bubbles formed along the inside of pipe 11 to travel toward the tank and to the space between screen 22 and the tank wall. This assures the desired single-phase liquid withdrawal from the tank. In FIG. 1, the spacing of the screens 22 and 23 from the tank and outlet walls is exaggerated, for clarity of illustration.

In the event that tank T stays in the position of FIG. 1, the liquid L will remain in its original position. However, if the position of tank T should be shifted, as to the position of FIG. 2, corresponding to the tank being turned on its side, even under the influence of zero or reduced gravity, the inertia of liquid L, particularly, will cause the vapor and liquid to tend to remain in the position in space occupied by them. Thus, if the tank T is shifted to the position of FIG. 2, for instance, the liquid L will tend to remain stationary while the tank T moves, thus occupying a position intermediate to the liquid and vapor outlets, with probably some of the liquid remaining in outlet 11, but some of the vapor moving into outlet 11. Thus, if the valve 12 is opened, both gas and liquid will flow through the liquid outlet. However, as shown in FIG. 2, screens 22 and 23, through the adhesion of liquid L to the spaces therein, will tend to maintain the liquid in its position relative to the liquid outlet, so that if liquid is to be discharged later, the liquid supply will be located within and adjacent to the liquid outlet. Similiarly, the vapor V will remain in proximity to the vapor outlet 15, so that if venting becomes necessary at any later time, vapor only will be discharged and no liquid will be used unnecessarily.

Another explanation of this separation of fluid is that a wetting liquid tends to minimize its free surface energy, e.g., Equation 1. This is not a new phenomenon, but rather is an example of the second law of thermodynamics, which is usually stated that a system will tend toward a state of maximum entropy. In the case of a totally wetting liquid, Equation 1 is simply:

$$E_s = (\sigma A)_{lv} \qquad (7)$$

and the minimization of the free surface energy is concerned with reducing the liquid-vapor interfacial energy only, since it is the only interfacial energy which can be minimized, i.e.:

$$(\sigma A)_{lv} \rightarrow 0 \qquad (8)$$

Equation 8, above, means that the liquid-vapor free surface will assume a concave shape of constant curvature. A particular example, for a totally wetting liquid, is when the liquid partially fills a tapered tube. The liquid will, because of Equation 8, position itself at the small end of the tube, rather than the larger end, since the liquid-vapor interfacial area is minimized in such a position. Another way of stating this is that a wetting liquid will move to the location where it wets the greatest solid surface area for its given liquid mass. Conversely, the opposite is true for a non-wetting liquid, which will position itself where it covers the minimum solid surface area. Thus, a wetting liquid, in the tapering space between screen 22 and tank wall 10 of FIG. 1, will move, through adhesion forces, toward the liquid outlet 11. For this same reason, the standpipe 23 may similarly taper, so as to be spaced at increasing distance from the inside of outlet 11, between valve 12 and the tank wall 10, as indicated previously.

Figure 3:
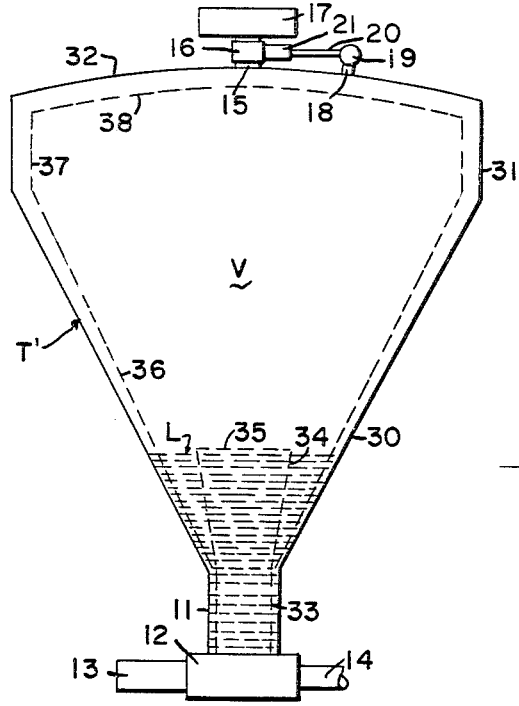
FIG. 3 is a partially diagrammatic, side elevation of an alternate storage system also embodying the principles of this invention, but including a conical-cylindrical tank adapted to contain a two phase fluid which is wetting in the liquid phase.

In the system of FIG. 3, a conical cylindrical tank T', which may generally be larger in size than the spherical tank T of FIG. 1, has a conical inner wall 30, at the apex of which is located liquid discharge pipe 11, and a cylindrical wall 31 having a convex end 32, in the center of which is located the vapor outlet 15 and vapor discharge control valve 16. Additional parts of the means for controlling the discharge of liquid and the discharge of vapor are similar to those of FIG. 1, including liquid outlet valve 12, controlled by solenoid 13, for discharging liquid through pipe 14. As before, vapor discharged when valve 16 opens passes through T 17, while a pressure switch 19, located at a vapor connection 18 controls solenoid 21 through an electrical cable 20. A foraminous standpipe 33 extends into liquid outlet pipe 11, having an inverted conical upper end 34 within the tank provided with an end screen 35. The foraminous means spaced from the inside of the tank walls includes a conical screen section 36, which is spaced closer to the inside of the tank walls adjacent the liquid outlet 11 and at increasing distances therefrom along the conical tank section 30; a cylindrical screen portion 37, spaced at increasing distances from the cylindrical tank section 31; and an arcuate, convex screen portion 38, spaced a still further distance from the tank section 32, with the center of the screen section 38 being opposite the vapor outlet 15. As before, liquid L in the tank will be maintained adjacent the liquid outlet 11, while the remaining space within the tank will be filled by vapor V. As will be evident, if the vessel of FIG. 3 is turned on its side, in the same manner as the vessel of FIG. 1 is turned on its side of FIG. 2, the liquid will remain adjacent the liquid outlet, when under the influence of zero or reduced gravity. Similarly, the vessel of FIG. 3 may be turned around 360°, either in the plane of the figure or any plane disposed angularly thereto, and the liquid L still remains adjacent the liquid outlet.

This liquid and vapor position has been explained earlier in the discussion of minimization of free surface energy. Positioning of the screen near the tank wall is essential and is simply based upon the aforementioned fact that a wetting liquid will position itself where it wets the greatest solid surface area, thereby minimizing the liquid-vapor free surface energy. Thus, liquid will be held by intermolecular forces at the tank outlet while vapor will be held at the vent port.

Figure 4:
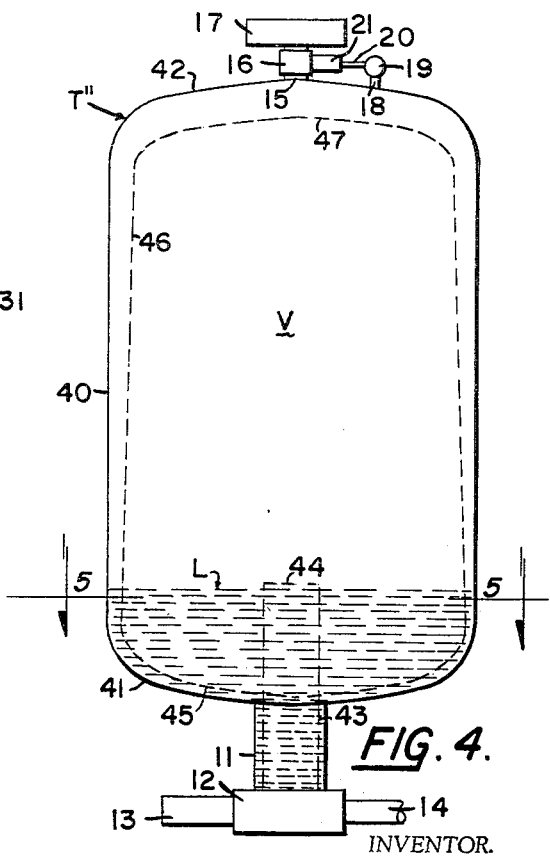
FIG. 4 is a partially diagrammatic, side elevation of a further alternative storage system also embodying the principles of this invention, but including a cylindrical tank adapted to contain a two phase fluid which is wetting in the liquid phase.

In the system of FIG. 4, the vessel comprises a cylindrical tank T'', which will normally be still larger than the tank of FIG. 3, and which includes a cylindrical inner wall 40 having convex ends 41 and 42. As before, a foraminous standpipe 43 extends from within liquid outlet 11 to a point within the tank, the end opposite valve 12 being closed by a circular end screen 44. At the convex end 41 of the tank, adjacent liquid outlet 11, a convex screen 45 surrounds standpipe 43, being spaced closer to the inside of the tank wall at the standpipe 43, the spacing increasing in distance outwardly therefrom to a generally cylindrical screen 46 which will have a slightly inverted conical shape, since the distance between screen 46 and the inside of the cylindrical wall 40 of the tank will increase from the liquid outlet toward the vapor outlet end. Joined to the opposite end of screen 46 is a second convex screen 47 which is spaced further from the convex end 42 of the tank and is, of course, opposite the vapor outlet 15. As before, the spacing of screens 43, 45, 46 and 47 from the outlet and tank walls, respectively, is exaggerated for clarity of illustration. As will be evident, the discharge of liquid from liquid outlet 11, through pipe 14, is controlled by a valve 12, in turn operated by a solenoid 13, while the discharge of vapor from vapor outlet 15 through T 17 is controlled by valve 16, actuated by solenoid 21 connected by an electrical cable 20 with pressure switch 19, subjected to the pressure of vapor within the tank at a vapor connection 18.

Figure 5:
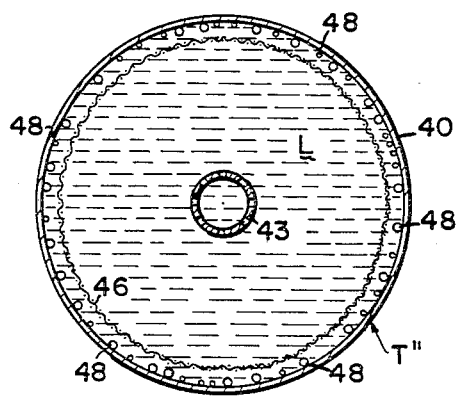
FIG. 5 is a cross-section taken along line 5—5 of FIG. 4.

In FIG. 5, the foraminous means comprising the standpipe 43 is shown as perforated metal, while the foraminous means forming the cylindrical screen 46 is shown as a wire mesh screen, but it will be understood that each of the foraminous means in the same vessel or tank may be the same or different, while other suitable constructions for the screen or foraminous means may be utilized. Also shown in FIG. 5 are bubbles 48 of gas collecting on the inside of the tank wall, due to vaporization of liquid through thermal energy received from radiation effects or the like and transferred through the wall of the tank, which again may be double walled, as well as insulated. As will be evident, bubbles of gas forming at the tank wall due to heat transmission through the tank wall normally will not leave the wall, because of the absence of a buoyancy force, but will be formed between the foraminous means and the wall of the tank. Since the liquid held by capillary action within the spaces provided in the foraminous means forms a barrier, in the event a large number of bubbles coalesce, the only direction which the coalesced bubbles can move is along the space between the foraminous means and the wall of the tank. Thus, any bubbles formed within the liquid outlet 11 and coalescing into a film or blanket along the wall will move, if at all, between the foraminous standpipe 43 and the inside of the outlet 11 into the space between the screen 45 and the tank wall. From another standpoint, liquid remaining in the space between screen 46 and the tank wall above the coalesced bubble film or blanket should, through minimization of free surface energy, move toward the outlet, thereby displacing the coalesced bubble film or blanket toward the vapor outlet. As will be evident, as soon as such coalesced bubbles pass the level of the liquid (it being understood that the term "level" is used herein to connote a relative rather than a gravitational position), the bubbles will no longer be prevented by the barrier, formed through capillary action of the foraminous means holding the liquid, from travelling inwardly, and thus may disperse and join the remainder of the vapor V. Of course, if the coalesced bubble film or blanket should build up to an extent which might cause vapor, under the increased pressure thereby produced, to penetrate the barrier at the screen, particularly adjacent the outlet, or when the screen barrier is weakened by random vehicle movement, then the tank should be vented. It should be noted that the actual boiling and bubble growth phenomena during reduced gravity are at present the subject of considerable investigation by various research organizations. Although these phenomena are not clearly understood, the important feature of the screen 45 is that it prevents vapor from entering the bulk liquid.

Figure 6:
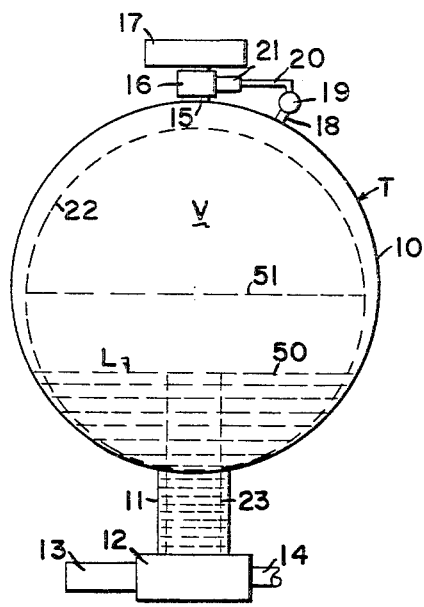
FIG. 6 is a partially diagrammatic, side elevation similar to FIG. 1, but illustrating a system adapted to be utilized when the discharge of fluid is to be stopped and started again a plurality of times.

In the system of FIG. 6, which is used for fuel supply, provision is made for one or more restarts, the tank T thereof being similar to tank T of FIG. 1, as shown by parts having the same numbers, but including screens 50 and 51 transverse to the axis of the outlet pipe 11, with transverse screen 50 being placed at the inner end of standpipe screen 23 and transverse screen 51 being placed at approximately the center of the tank. It will be understood, of course, that such placement of screens 50 and 51 correspond to the level of liquid at the end of each of a plurality of firings of rocket engines or the like. Thus, after the first firing, the level of liquid should be at screen 51 and after a second firing, at screen 50 Depending upon the amount of fuel, including oxygen, used in the respective firings, the screens 50 and 51 may be placed at different positions, or only one or more than two transverse screens may be utilized. As shown, the "level" of liquid L, at the end of the previous firings, has reached screen 50, which not only stabilizes the liquid in the tank, during shifting of the tank in position, as well as during shocks resulting from sudden movement or reaction to forces transmitted to the tank through the vehicle structure, as from sudden guidance or attitude correction movements, or operations within the vehicle itself. Such forces may tend to cause waves or ripples to form on the surface of the liquid, which would be suppressed by screen 50, or similarly by screen 51 when the liquid level is at that screen. Furthermore, these screens serve as a trap to hold the liquid at the outlet when the system is perturbed by various external forces in a reduced or zero gravity environment.

For fluids such as nitrogen tetroxide and hydrazine, the reliability of the storage system of FIG. 6 may be increased by coating both the screen 22 and the inside of tank wall 10, between transverse screen 51 and the vapor outlet, with a low surface energy material, such as Teflon or polyethylene. In the event of a disturbance which causes splashing, for instance, the non-wetting characteristic of such fluids displayed toward such materials, will prevent adherence of splashing liquid to the screen or tank wall over the coated area.

Figure 7:
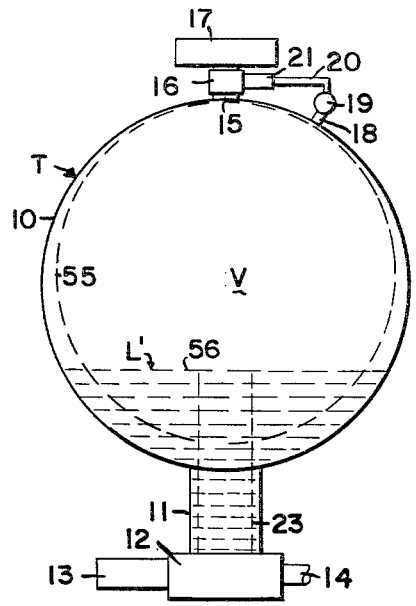
FIG. 7 is a partially diagrammatic, side elevation of a storage system embodying the principles of this invention, for use with a two phase fluid which is non-wetting in the liquid phase.

The system of FIG. 7 is adapted for storage of fluid which, in the liquid stage, is a non-wetting liquid L', and is applied to tank T which is similar to tank T of FIG. 1, as indicated by the same reference numerals applied to parts 10 to 21, inclusive. The liquid outlet standpipe 23 is similar, but spherical screen 55 is eccentric in the opposite direction, i.e., is spaced closer to the tank wall 10 adjacent the vapor outlet 15 and at increasing distances from the tank wall toward the liquid outlet 11. A transverse screen 56 may again be employed, to stabilize the liquid for restart, but may be omitted for other uses. With a fluid which is non-wetting in the liquid phase, minimization of free surface energy will cause liquid in the spaces between screen 55 and tank wall 10 to move toward the liquid outlet, since a non-wetting liquid tends to cover a minimum surface area for its liquid mass. For similar reasons, standpipe 23 of FIG. 7 may be tapered upwardly and inwardly, i.e., decrease in diameter from valve 12 toward tank wall 10.

The system of FIG. 7 may also be utilized with certain normally wetting liquids, by coating screen 55 with a low surface energy material with respect to which the normally wetting liquid is non-wetting. Examples of such a material are Teflon and polyethylene, with respect to which liquids, such as nitrogen tetroxide and hydrazine, are non-wetting, i.e., the contact angle $\theta > 90°$. This has the advantage of utilization of a greater spacing between the screen and the tank wall adjacent the outlet, thereby accommodating a larger volume of coalescing gas bubbles before venting might be necessary.

In the system of FIG. 8, the tank T is provided with a spherical screen 61 which has a slightly smaller diameter than tank wall 10, being concentrically mounted therein and spaced approximately ⅛ to ½ inch therefrom forming a liquid-containing annulus therebetween. This embodiment finds particular application with non-cryogenic liquids where the problem of the liquid boil-off is not present. Tank 10 is provided with a liquid outlet 11, the discharge therefrom being controlled by valve 12. In this embodiment, almost the entire tank T is filled with liquid L which is located on both the inside and outside of screen 61. A vapor bubble V of inert gas is located with the screen 61 but is prevented by the screen from permeating into the annulus. The liquid L within tank T is expelled by the vapor pressure of the vapor bubble V which forces the liquid through screen 61 and through outlet 11. When the vapor pressure drops below a predetermined value additional gas may be admitted through gas inlet 62 by means of valve 63 to the interior of screen 61. In this manner, it can readily be understood that liquid will be supplied to outlet 11 at all times until all the liquid is expelled from within the screen 61. At this point, the vapor pressure will then cause gas to pass through screen 61 and from this point on the presence of liquid alone at liquid outlet 11 cannot be assured. Thus, the usable volume of liquid is that contained within screen 61. However, by spacing the screen a very short distance from the tank wall 10 it will be understood that the annulus will be very small so that the loss of usable propellant will be quite small thereby providing high expulsion efficiencies. In addition, a transverse screen 64 is provided within the container near outlet 11. The purpose of this screen is to assure that the liquid below the screen will remain adjacent outlet 11 even under negative gravity situations which may be encountered during flight. This lateral screen may be coarser than the annular screen so that the ullage gas will break through the lateral screen first to expel the fluid in the area between the lateral screen and the portion of the annular screen adjacent outlet 11.

The system of FIG. 9 is similar to that of FIG. 8, however, in this embodiment the annular screen 71 is located only at the lower end of the tank near the outlet pipe 11 and terminates at its upper ends in a transverse screen 72, as shown, forming an envelope. Above this screen may be another transverse screen 73 extending to tank wall 76. A pressurization pipe 74 may extend from the top of the container down into the portion of the tank bounded by screens 71 and 72. This arrangement is useful in a main propellant tank wherein substantially all of the propellant above screen 73 is used during lift off and early flight to put the vehicle in orbit. By having screen 73 as fine or a finer mesh than screen 72 the liquid therebelow which was not used in the initial flight will be trapped. When in space, a number of restarts could be brought about using the propellant in this space. Since very little propellant is necesary for maneuvering in space, the volume enclosed by screen 73 need not be a very large percentage of the total volume of the tank. Also screens 72 and 73 will prevent the liquid from being pulled away from liquid outlet 11 whenever the system encounters sudden impulse.

A modified arrangement is shown in FIG. 10 wherein the upper end of screen 71 is closed off by a solid annular ring 77 extending to tank wall 70 with a screen 78 extending across the center of ring 77. Screen 78 may be coarser than screen 71. In this embodiment, the vapor is above screen 78 and will break therethrough forcing the liquid through screen 71 and through outlet 11. The vapor, however, will not penetrate screen 71 until all liquid has been expelled from within screen 71.

It will be understood, of course, that, although the principles of this invention have been described as applied to spherical, conical-cylindrical and cylindrical tanks, they may be applied to other shapes of tanks, such as conical, frusto-conical, toroidal and others. Also, other changes may be made, without departing from the spirit and scope of this invention.

What is claimed is:
1. A two phase fluid storage system for use in a reduced or zero gravity environment for providing vapor venting where vapor pressure tends to build up through vaporization of a liquid phase by heat being conducted through the walls of a storage vessel comprising:
a storage vessel having walls;
foraminous means located within said storage vessel and substantially conforming to the configuration of said vessel;
said vessel walls and said foraminous means defining two volumes:
a first volume located within and bounded at least almost entirely by said foraminous means; and
a second volume substantially surrounding and smaller than said first volume, being bounded interior by said foraminous means and exteriorly by said vessel walls;
first outlet means for relieving vapor pressure buildup in said vessel, said first outlet means communicating with said second volume only; and
a second opening in said vessel for admitting or withdrawing liquid into or from said vessel.
2. The storage system of claim 1 including further:
means for sensing pressure within said vessel, and
wherein said first outlet means is responsive to said pressure sensing means and operates to vent vapor from said vessel when said pressure sensing means indicates that pressure within said vessel has reached a predetermined value.
3. The storage system of claim 1 including further:
a pipe connected to said vessel walls at said second opening, and wherein
said foraminous means further includes a foraminous member arranged in and spaced from the periphery of said pipe providing a vaporization region between said foraminous member and the periphery of said pipe.
4. The storage system of claim 3 including further:
means for sensing pressure within said vessel, and wherein
said first outlet means is responsive to said pressure sensing means and operates to vent vapor from said vessel when said pressure sensing means indicates that pressure within said vessel has reached a predetermined value.
5. A two phase fluid storage system for use in a reduced or zero gravity environment for providing vapor venting where vapor pressure tends to build up through vaporization of a liquid phase by heat being conducted through the walls of a storage vessel comprising:
a storage vessel having walls;
foraminous means for creating a vapor barrier, substantially conforming to the configuration of said vessel and located within said vessel;
said vessel walls and said foraminous means defining two volumes:
a first volume located within and bounded substantially by said foraminous means; and
a second volume substantially surrounding and smaller than said first volume, being bounded interiorly substantially by said foraminous means and exteriorly by said vessel walls;
first outlet means for relieving vapor pressure buildup in said vessel, said first outlet means communicating with said second volume only and comprising pressure sensitive vent means for venting vapor when vapor pressure in said vessel reaches a pressure less than that required to break said vapor barrier provided by said foraminous means and penetrate said first volume; and
a second opening in said vessel for admitting or withdrawing liquid into or from said vessel.

6. The storage system of claim 5 including further:
a pipe connected to said vessel walls at said second opening, and wherein
said foraminous means further includes a foraminous member arranged in and spaced from the periphery of said pipe providing a vaporization region between said foraminous member and the periphery of said pipe.

7. A two phase fluid storage system for use in a reduced or zero gravity environment for maintaining the position of the vapor and liquid phases fixed with respect to particular positions on the wall of a storage vessel comprising:
a storage vessel having walls; and
foraminous means located within said storage vessel, conforming to the configuration of said vessel, and mounted eccentric to said vessel walls;
said vessel walls and said foraminous means defining two volumes:
a first volume located within and bounded substantially entirely by said foraminous means, and
a second narrow volume substantially surrounding and smaller than said first volume, being bounded interiorly substantially by said foraminous means and exteriorly by said vessel walls, said second volume being tapered toward a point where the distance of said foraminous means from said vessel walls is a minimum; and
outlet means opening into said second volume adjacent said point.

8. The storage system of claim 7 including further:
a pipe connected to said vessel walls at said outlet and wherein
said foraminous means further includes a foraminous member arranged in and spaced from the periphery of said pipe providing a vaporization region between said foraminous member and the periphery of said pipe.

9. The storage system of claim 7 including further:
second outlet means opening into said vessel at a point where the distance of said foraminous means from said vessel walls is a maximum.

10. The storage system of claim 9 including further:
means for sensing pressure within said vessel, and
wherein said second outlet means is responsive to said pressure sensing means and operates to vent vapor from said vessel when said pressure sensing means indicates that pressure within said vessel has reached a predetermined value.

References Cited

UNITED STATES PATENTS

| | | | |
|---|---|---|---|
| 3,379,855 | 4/1968 | Forrester et al. | 222—187 X |
| 3,286,463 | 11/1966 | McGroarty | 60—39.48 |
| 3,176,882 | 4/1965 | Meermans | 222—187 |
| 1,680,243 | 8/1928 | Becker | 55—435 X |

OTHER REFERENCES

Petrash, Donald A., Nelson, Thomas M., Otto, Edward W.: NASA TN D-1582, Effect of Surface Energy of Liquid-Vapor Interface Configuration During Weightlessness, NASA, Washington, D.C., 1963, pages 1–4, 7, 18, 19, 22, 26, 27, 29, 30.

REUBEN FRIEDMAN, Primary Examiner

R. W. BURKS, Assistant Examiner

U.S. Cl. X.R.,
55—431; 62—55